United States Patent
Shibuya et al.

(10) Patent No.: US 7,489,432 B2
(45) Date of Patent: Feb. 10, 2009

(54) ELECTROCHROMIC DISPLAY DEVICE AND DISPLAY APPARATUS

(75) Inventors: Takeshi Shibuya, Yokohama (JP); Shigenobu Hirano, Yokohama (JP); Satoshi Uchida, Sendai (JP); Yoshitaka Sanehira, Sendai (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/384,667

(22) Filed: Mar. 21, 2006

(65) Prior Publication Data
US 2006/0215250 A1   Sep. 28, 2006

(30) Foreign Application Priority Data
Mar. 25, 2005   (JP) .............................. 2005-088201

(51) Int. Cl.
*G02F 1/153*   (2006.01)
*G09G 3/19*   (2006.01)
*C09K 19/02*   (2006.01)

(52) U.S. Cl. ...................... 359/270; 345/49; 349/182
(58) Field of Classification Search ................. 359/270
See application file for complete search history.

(56) References Cited

U.S. PATENT DOCUMENTS

| 6,034,290 | A | * | 3/2000 | Harmer et al. | ............... 570/236 |
| 6,067,184 | A | * | 5/2000 | Bonhote et al. | ............. 359/265 |
| 6,521,677 | B2 | * | 2/2003 | Yashiro et al. | ............... 523/212 |
| 2006/0215250 | A1 | | 9/2006 | Shibuya et al. | |
| 2007/0024948 | A1 | | 2/2007 | Hirano et al. | |

FOREIGN PATENT DOCUMENTS

| JP | 2000-506629 | | 5/2000 |
| JP | 2001-510590 | | 7/2001 |
| JP | 2002-328401 | | 11/2002 |
| JP | 2003-511837 | | 3/2003 |
| JP | 2004-265054 | | 9/2004 |
| JP | 2004-537743 | | 12/2004 |
| WO | WO 97/35227 | | 9/1997 |
| WO | WO 98/35267 | | 8/1998 |
| WO | WO 9935312 A1 | * | 7/1999 |
| WO | WO 01/27690 A2 | | 4/2001 |
| WO | WO 0127690 A2 | * | 4/2001 |
| WO | WO 03/001288 A2 | | 1/2003 |

OTHER PUBLICATIONS

U.S. Appl. No. 11/384,667, filed Mar. 21, 2006, Shibuya, et al.
U.S. Appl. No. 11/366,402, filed Mar. 3, 2006, Hirano, et al.
U.S. Appl. No. 11/856,311, filed Sep. 17, 2007, Hirano, et al.

* cited by examiner

*Primary Examiner*—Ricky L Mack
*Assistant Examiner*—Dawayne A Pinkney
(74) *Attorney, Agent, or Firm*—Oblon, Spivak, McClelland, Maier & Neustadt, P.C.

(57) ABSTRACT

To provide an electrochromic display device which includes a display electrode formed of a substrate having a transparent conductive film; a counter electrode formed of a substrate having a transparent conductive film; and a metal oxide layer which contains a metal oxide and is disposed on the display electrode, the metal oxide layer having an organic electrochromic compound attached, wherein the metal oxide is a long fibrous metal oxide.

13 Claims, 1 Drawing Sheet

ELECTROCHROMIC DISPLAY DEVICE AND DISPLAY APPARATUS

BACKGROUND OF THE INVENTION

1. Field of the Invention

The present invention relates to an electrochromic display device used for reflective displays, electronic paper and the like.

2. Description of the Related Art

Recently, much research effort has been made to electronic paper as an electronic medium that is expected to displace paper. In contrast to conventional displays including CRTs and liquid crystal displays (LCDs), electronic paper requires the following characteristics: being a reflective display device; high white reflectivity and contrast ratio; high definition display; memory effect; low-voltage drive capability; slimness; lightness; and inexpensiveness, for example. In particular, electronic paper is required to have as excellent white reflectivity and contrast ratio as paper with respect to its display characteristics, and the development of a display device offering all of these characteristics is far from easy. Although electronic paper technologies, such as reflective liquid crystal devices, electrophoretic display devices and toner electrophoretic displays, have heretofore been proposed, they are poor in white reflectivity.

A phenomenon in which electrochromic materials applied with a voltage show a reversible color change during the electrochemical redox reaction is called electrochromism. Electrochromic (hereinafter sometimes abbreviated as "EC") display devices, which utilize color change in EC compounds causing such a phenomenon, have emerged as a candidate for electronic paper because they serve as a reflective display device, have high white reflectivity as well as a memory effect, and can be driven at low voltage. For example, Japanese Patent Application Laid-Open (JP-A) No. 2000-506629, Japanese Patent Application Laid-Open (JP-A) No. 2001-510590, Japanese Patent Application Laid-Open (JP-A) No. 2003-511837, Japanese Patent Application Laid-Open (JP-A) No. 2002-328401, and Japanese Patent Application Laid-Open (JP-A) No. 2004-537743 disclose an EC device in which organic EC compounds are attached to the surfaces of particles made of, for example, titanium oxide.

Such EC devices are known for their ability of efficiently changing colors by utilizing a surface-area effect of a metal oxide, as well as for their excellent durability. The EC device is a current-driven device and therefore requires high electrical power consumption, thereby posing problems relating to an improvement in the efficiency of color production.

SUMMARY OF THE INVENTION

It is an object of the present invention to provide a reflective electrochromic display device with high white reflectivity, high contrast ratio, and high color-production efficiency, and a display apparatus using the display device.

The present inventors have diligently conducted studies and established that it is possible to solve the foregoing problems by using a long fibrous metal oxide as a metal oxide used in the metal oxide layer provided on the surface of the display electrode of an electrochromic device.

The electrochromic device of the present invention includes: a display electrode formed of a substrate having a transparent conductive film; a counter electrode formed of a substrate having a conductive film; and a metal oxide layer which contains a metal oxide and is disposed on the surface of the display electrode, the metal oxide layer having an organic electrochromic compound attached, wherein the metal oxide is a long fibrous metal oxide.

The display apparatus of the present invention is one using the display device of the present invention.

DESCRIPTION OF THE PREFERRED EMBODIMENTS

Figure 1:
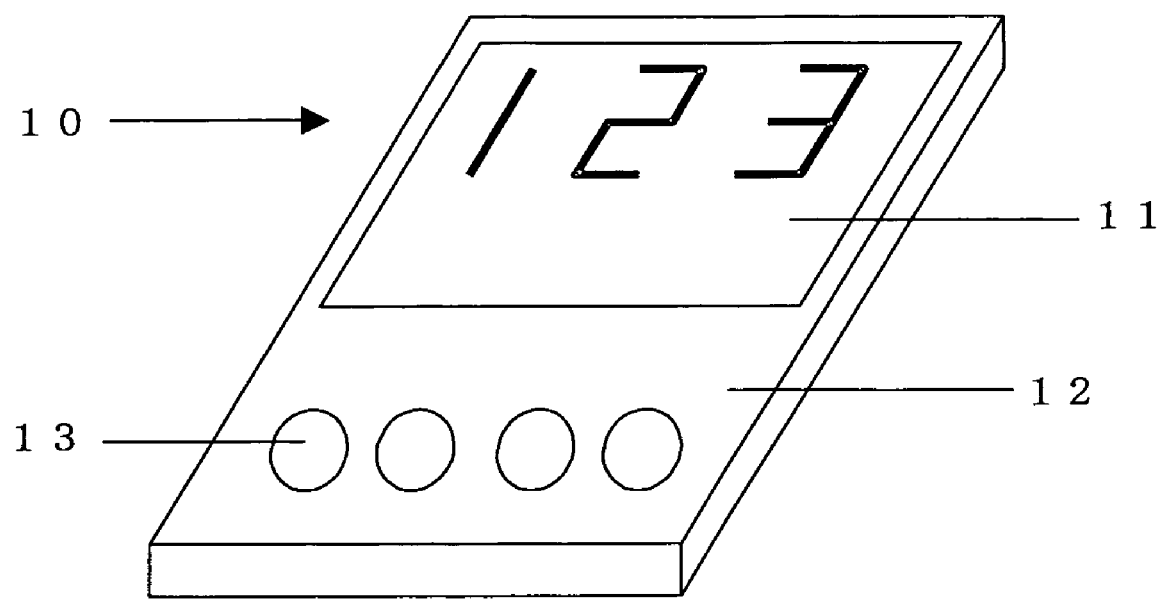
FIG. 1 shows an example of the configuration of a display apparatus in which an electrochromic display device of the present invention is used.

The electrochromic device of the present invention includes: a display electrode formed of a substrate having a transparent conductive film; a counter electrode formed of a substrate having a conductive film; a metal oxide layer which contains a metal oxide and is disposed on the surface of the display electrode, the metal oxide layer having an organic electrochromic compound attached; and an electrolyte, and further includes an additional component on an as-needed basis.

When a long fibrous metal oxide is used as the metal oxide the electrochromic display device of the present invention offers excellent color-production efficiency. However, the detailed mechanism of which still remains elusive. It may, however, be achieved because the long fibrous structure is possibly suitable for efficient adsorption of organic electrochromic compounds.

Metal oxides used for the electrochromic display device of the present invention are not particular limited as long as they have a long fibrous structure on which organic electrochromic compounds can be adsorbed; metal oxides that conform well to the characteristics of the electrochromic display device are suitably used.

Examples of the metal oxides include, but not limited to, titanium oxide, zinc oxide, tin oxide, alumina, zirconia, ceria, silica, yttria, boronia, magnesia, strontium titanate, potassium titanate, barium titanate, calcium titanate, calcia, ferrite, hafnia, tungsten trioxide, iron oxide, copper oxide, nickel oxide, cobalt oxide, barium oxide, strontium oxide, vanadium oxide, indium oxide, barium titanate, aluminosilicate, niobium oxide and calcium phosphate. These compounds can be selected depending on the intended use, and may be used singly or in combination. Among these metal oxides, titanium oxide, zinc oxide, tin oxide, alumina, zirconia, iron oxide, magnesia, indium oxide and tungsten oxide are preferable. Titanium oxide is most preferable for its electrical and physical characteristics.

The electrochromic display device of the present invention offers excellent color-production efficiency when at least long fibrous titanium oxide is used as a long fibrous metal oxide.

Moreover, the electrochromic display device of the present invention also offers excellent color-production characteristics when the long fibrous titanium oxide has a nanowire or nanotube structure. As used herein the term "nanowire" means a wire (or filamentous structure) with a diameter scale on the order of nano meters (nm), and the term "nanotube" means a tube (or tubular structure) with a diameter scale on the order of nano meters (nm).

A titanium oxide nanowire and a titanium oxide nanotube are suitably used because they have excellent stability and color-production characteristics, and can be produced easily. The electrochromic display device of the present invention offers excellent color-production characteristics when the long fibrous metal oxide has a BET specific surface area of 100 m$^2$/g or more. This may be because the larger the BET specific surface area, the more the amount of an organic electrochromic compound adsorbed on the metal oxide. The BET specific surface area is preferably 200 m$^2$/g to 500 m$^2$/g.

The method for forming a metal oxide layer containing a metal oxide on the surface of a display electrode is not particularly limited, and can be appropriately selected depending on the intended purpose. For example, a metal oxide layer can be formed by applying a dispersant of metal oxide on a glass substrate, the entire surface of which is covered with a transparent electrode film, by spin coating, and sintering the dispersant.

The organic electrochromic compounds are not particularly limited and can be appropriately selected depending on the intended use; examples thereof include known electrochromic compounds such as viologen compounds, styryl compounds, phenothiazine compounds, anthraquinone compounds, pyrazoline compounds, fluoran compounds and phthalocyanine compounds.

Examples of the viologen compounds include 1-Pentyl-1'-(3-phosophonopropyl)-4,4'-bipyridinium dichloride, 1-Ethyl-1'-(2-phosphonoethyl)-4,4'-bipyridinium dichloride, 1-p-cyanophenyl-1'-(2-phosphonoethyl)-4,4'-bipyridinium dichloride, Bis(2-phosphonoylethyl)-4,4'-bipyridinium dichloride and 1-Ethyl-1'-acetic acid-4,4'-bipyridinium dichloride.

Examples of the styryl compounds include 2-[2-[4-(dimethylamino)-5-carboxy-phenyl]ethenyl]-3,3-dimethylindolino [2,1-b]oxazolidine, 2-[2-[4-(dimethylamino)-5-carboxy-phenyl]-1,3-butadienyl]-3,3-dimethylindolino [2,1-b]oxazolidine and 2-[2-[4-(dimethylamino)phenyl]-1,3-butadienyl]-3,3-dimethyl-5-sulfonylindolino [2,1-b]oxazolidine.

Examples of the phenothiazine compounds include (2-Phenothiazin-10-yl-ethyl)-phosphinic acid, 3-Phenothiazin-10-yl-propionic acid and 3-Phenothiazin-10-yl-methanesuffonic acid.

Examples of the anthraquinone compounds include hydroxyanthraquinone-1-sulfonic acid and hydroxyanthraquinone-2-sulfonic acid.

Examples of the pyrazoline compounds include triphenylpyrazoline, styrylpyrazoline.

Examples of the fluoran compounds include 2-anilino-3-methyl-6-diethylaminofluoran, 2-anilino-3-methyl-6-(N-n-propyl-N-methylamino)fluoran, 2-anilino-3-methyl-6-(N-n-amyl-N-methylamino)fluoran, 2-anilino-3-methyl-6-(N-iso-amyl-N-ethylamino)fluoran, 2-anilino-3-methyl-6-(N-n-propyl-N-isopropylamino)fluoran, 2-anilino-3-methyl-6-(N-hexyl-N-methylamino)fluoran, and 2-anilino-3-methyl-6-(N-ethyl-N-p-toluidino)fluoran.

Examples of the phthalocyanine compounds include lanthanoid-diphthalocyanine.

Among these, viologen compounds are most preferable because they produce colors upon reduction and can produce many different colors depending on the molecular structure.

Moreover, the organic electrochromic compounds preferably have an adsorption site that allows them to be attached to the surface of a long fibrous structure of metal oxide. Examples of such an adsorption site include the structures of phosphonic acid, carboxylic acids, sulfonic acids and salicylic acid. High adsorption capacity of the phosphonic acid structure makes it most useful for such an adsorption site.

The method for attaching the organic electrochromic compound to the surface of a long fibrous structure of metal oxide is not particularly limited, and can be appropriately selected depending on the intended purpose. For example, the organic electrochromic compound can be adsorbed on such a surface by immersing a display device in a solution in which the organic electrochromic compound is dissolved.

In the reflective display device of the present invention it is possible to attach different types of organic EC compounds to metal oxide. Organic electrochromic compounds, such as viologen compounds, can show different colors depending on their molecular structure. For example, simultaneous attachment of a blue-showing compound and a red-showing compound to the surface of metal oxide can lead to the production of aubergine (almost black). Accordingly, the reflective display device of the present invention can be provided with the following advantage: it is possible to offer a wide range of color variations and to display a black color with high visibility.

Glass or a plastic film can be used for the substrate. In particular, the use of a substrate formed of a plastic film can lead to a light, flexible display apparatus. For the display electrode, any general material, such as ITO, FTO or ZnO, can be used. The counter electrode, formed of a substrate made of glass or plastic, may have a conductive film formed on the substrate. Alternatively, the counter electrode may be formed of a metallic substrate that itself is conductive.

An electrolyte is provided between the display electrode and the counter electrode. Examples of the electrolyte include liquid electrolytes obtained by dissolving lithium salts such as lithium perchlorate and lithium borofluoride in organic solvents such as acetonitrile and propylene carbonate; and solid electrolytes such as perfluorosulfonic acid polymer film. Liquid electrolytes have the advantage of high ion conductivity. Solid electrolytes suffer very little degradation and thus are suitable for the preparation of devices with high durability.

Any method can be adopted for driving the reflective display device of the present invention as long as voltage and current of any given level can be applied thereto. The use of a passive-matrix driving scheme realizes the production of inexpensive display apparatus, whereas the use of an active-matrix driving scheme can realize high definition, high speed display. Active-matrix driving can be readily realized in the reflective display device of the present invention by providing active-matrix driving elements on the surface of the counter electrode.

The display device of the present invention can be used for example for the display unit of mobile devices such as laptop computers, PDAs and cellular phones; electronic paper such as electronic books and electronic newspaper; electronic bulletin boards such as advertising signs, posters and black boards; the display unit of copiers, rewritable paper as substitute for printer sheets, calculators and electronic appliances; the display unit of discount cards; electronic advertisement; and electronic POP. Specifically, the display device of the present invention is suitable for the image display apparatus described below.

(Display Apparatus)

The display apparatus of the present invention includes the display device of the present invention, a drive circuit, an arithmetic circuit, an internal memory and a power source, and further includes an additional unit on an as-needed basis.

The display apparatus of the present invention adopts the electrochromic display device of the present invention which has high white reflectivity, high contrast ratio, and high color-production efficiency. Thus, it is possible to provide a display apparatus offering excellent display performance.

FIG. 1 is a schematic diagram showing an example of the display apparatus of the present invention.

As shown in FIG. 1, a display apparatus 10 includes a display device 11, a housing 12, and an information receiving unit 13. The display apparatus 10 further includes for example a drive circuit, an arithmetic circuit, an internal memory, and a power source, which are not shown. The electrode of the display device 11 shown in FIG. 1 constitutes a dot matrix. Turning on the designated dots leads to the creation of an image as a whole.

Hereinafter, the present invention will be described in detail with reference to Examples, which however shall not be construed as limiting the scope of the invention thereto.

(1) Preparation of a Titanium Oxide Nanowire

A 30-ml Teflon (registered trademark) tube (Teflon tube FEP No. 3114-0030, produced by Nalgen-Nunc Inc) was charged with 21 g of an aqueous solution of potassium hydroxide (17 mol/kg) and 0.11 g of titanium oxide (P-25, produced by NIPPON AEROSIL. Co., Ltd.). The Teflon tube was then placed into GL-45, a heat-resistant glass bottle produced by Schott Duran, and the glass bottle was capped. The glass bottle was then retained at 110° C. for 20 hours, and the resultant product was washed and dried to give titanium oxide of interest.

SEM observation revealed the presence of a nanowire structure in the obtained titanium oxide, which was 10 nm to 15 nm in diameter, several hundreds of nm to several nm in length, and with a specific surface area of 390 $m^2/g$.

(2) Preparation of a Dispersion of the Titanium Oxide Nanowire

To a mixture of 4.9 g of an aqueous solution of nitric acid (pH: 0.7), 0.105 g of polyethyleneglycol, 0.14 g of acetylacetone and 0.14 g of Triton X (poly(oxyethylene)-octylphenylether, produced by Funakoshi Co., Ltd.) was added 2.1 g of the titanium oxide nanowire prepared in (1), followed by a dispersion treatment for 3 hours together with zirconia beads of 3 mm diameter by use of a paint shaker. In this way a dispersant of interest was prepared.

(3) Preparation of a Display Electrode

A display electrode was prepared in the following manner using 1-Pentyl-1'-(3-phosophonopropyl)-4,4'-bipyridinium dichloride (hereinafter abbreviated as "EC1") as an organic EC compound.

The dispersant of titanium oxide nanowire was then applied onto a portion (area: 1 $cm^2$) of a glass substrate, the entire surface of which is covered with a transparent electrode film made of tin oxide, to a thickness of about 2 μm by spin coating, followed by sintering at 400° C. for 1 hour to prepare a display electrode.

Next, EC1 was dissolved in water to a concentration of 0.04M, and the display electrode thus prepared was immersed in the resultant solution, whereby EC1 was adsorbed on the display electrode. The display electrode was then washed and dried. In this way a display electrode having EC1 was prepared.

(4) Preparation of a Counter Electrode

A counter electrode was prepared in the following manner: a 20% by mass aqueous dispersion of tin oxide particles having a primary particle diameter of 30 nm (produced by Mitsubishi Materials Corporation) was applied onto a glass substrate, the entire surface of which is covered with a transparent electrode film made of tin oxide, to a thickness of about 2 μm by spin coating, followed by sintering at 400° C. for 1 hour.

(5) Preparation of an Electrochromic Display Device

A display substrate and a counter substrate were bonded together, with spacers of 75 μm in thickness interposed between them. Thus, a cell was prepared. Subsequently, lithium perchlorate was dissolved in propylene carbonate to a concentration of 0.2M, and titanium oxide particles having a primary particle diameter of 300 nm (produced by Ishihara Sangyo Co., Ltd.) were dispersed in the resultant solution to a concentration of 35% by mass to prepare an electrolyte solution. The electrolyte solution thus prepared was sealed in the cell. Thus, an electrochromic display device of Example 1 was prepared.

EXAMPLE 2

(1) Preparation of Titanium Oxide Nanotube

A 30-ml Teflon (registered trademark) tube (Teflon tube FEP No. 3114-0030, produced by Nalgen-Nunc Inc) was charged with 21 g of an aqueous solution of sodium hydroxide (10 mol/kg) and 0.11 g of titanium oxide (P-25, produced by NIPPON AEROSIL. Co., Ltd.) The Teflon tube was then placed into GL-45, a heat-resistant glass bottle produced by Schott Duran, and the glass bottle was capped. The glass bottle was then retained at 110° C. for 20 hours, and the resultant product was neutralized with dilute hydrochloric acid and distilled water, washed, and dried to give titanium oxide of interest.

SEM observation revealed the presence of a nanotube structure in the obtained titanium oxide, which was about 8 nm in inner diameter, about 10 nm in outer diameter, several hundreds of nm in length, and with a specific surface area of 270 $m^2/g$.

(2) Preparation of a Dispersion of the Titanium Oxide Nanotube

To a mixture of 4.9 g of an aqueous solution of nitric acid (pH: 0.7), 0.105 g of polyethyleneglycol, 0.14 g of acetylacetone and 0.14 g of Triton X (poly(oxyethylene)-octylphenylether, produced by Funakoshi Co., Ltd.) was added 2.1 g of the titanium oxide nanotube prepared in (1), followed by a dispersion treatment for 3 hours together with zirconia beads of 3 mm diameter by use of a paint shaker. In this way a dispersant of interest was prepared.

(3) Preparation of a Display Electrode

A display electrode was prepared in the following manner using Bis(2-phosphonoylethyl)-4,4'-bipyridinium dichloride (hereinafter abbreviated as "EC2") as an organic EC compound.

The dispersant of titanium oxide nanotube was applied onto a portion (area: 1 $cm^2$) of a glass substrate, the entire surface of which is covered with a transparent electrode film made of tin oxide, to a thickness of about 2 μm by spin coating, followed by sintering at 400° C. for 1 hour to prepare a display electrode.

Next, EC2 was dissolved in water to a concentration of 0.04M, and the display electrode thus prepared was immersed in the resultant solution, whereby EC2 was adsorbed on the display electrode. The display electrode was then washed and dried. In this way a display electrode having EC2 was prepared.

(4) Preparation of a Counter Electrode

A counter electrode was prepared in the same manner described in Example 1.

(5) Preparation of an Electrochromic Display Device

An electrochromic display device of Example 2 was prepared in the same manner described in Example 1 except that the display electrode prepared in Example 2 was used.

COMPARATIVE EXAMPLE 1

An electrochromic display device of Comparative Example 1 was prepared in the same manner described in Example 1 except that a dispersion of fine particles produced in the following procedure was used instead of the dispersion of titanium oxide nanowire.

(2') Preparation of the Dispersant of Fine Particles

Five grams of easily-dispersible titanium oxide fine particles with a primary particle diameter of 30 nm (AMT-600, produced by produced by Tayca Co., Ltd.), 20 ml of water, 0.5 ml of concentrated nitric acid, and 0.5 g of polyethyleneglycol were mixed, followed by a dispersion treatment for 30 minutes together with zirconia beads of 2 mm diameter by use of a paint shaker. In this way a dispersant of fine particles was prepared.

Subsequently, color change tests were performed for the electrochromic display devices of Examples 1 and 2 and Comparative Example 1 in the procedure described below. The results are shown in Table 1.

<Color Change Test>

The display electrode and counter electrode of each of the electrochromic display devices were connected to a negative pole and a positive pole, respectively. Applying a voltage of 3.0V across the two electrodes for one second caused a certain portion of the metal oxide nanowire layer of the display electrode to produce a red-purple color, which is as a result of color production by the organic electrochromic compound. Applying a voltage of −1.0V across the two electrodes for one second then caused that portion to turn white (original color). The reflectivities of the electrochromic display devices during colored state and during non-colored state are shown in Table 1. Note that there was no difference in the amount of current that flowed in the respective display devices upon color production.

Color change tests were performed by irradiating the electrochromic display devices with a diffusive light using LCD-5000, a spectro color meter manufactured by OTSUKA ELECTRONICS Co., Ltd. Voltage application was carried out using FG-02, a function generator manufactured by Toho Technical Research. Measurement of the amount of current was made using a Coulomb Meter HF-203D manufactured by HOKUTO DENKO Corporation.

TABLE 1

|  | Reflectivity during colored state | Reflectivity during non-colored state |
| --- | --- | --- |
| Ex. 1 | 7% | 59% |
| Ex. 2 | 6% | 60% |
| Compara. Ex. 1 | 13% | 59% |

It can be learned from Table 1 that the reflectivity during colored state in Examples 1 and 2 is small compared to that in Comparative Example 1 and thus resulting in high color concentration.

What is claimed is:

1. An electrochromic display device, comprising:
    a display electrode formed of a substrate having a transparent conductive film;
    a counter electrode formed of a substrate having a transparent conductive film; and
    a metal oxide layer which contains a metal oxide and is disposed on the display electrode, the metal oxide layer having an organic electrochromic compound attached,
    wherein the metal oxide is a long fibrous metal oxide of a nanowire structure or a nanotube structure, and
    wherein the device has a reflectivity during colored state of not more than 7%.

2. The electrochromic display device according to claim 1, wherein the long fibrous metal oxide is long fibrous titanium oxide.

3. The electrochromic display device according to claim 1, wherein the long fibrous metal oxide has a BET specific surface area of 100 $m^2/g$ or more.

4. The electrochromic display device according to claim 1, wherein the organic electrochromic compound has an adsorption site that allows the organic electrochromic compound to be attached to the surface of the long fibrous metal oxide.

5. The electroebromic display device according to claim 4, wherein the adsorption site has the structure of phosphonic acid.

6. The electrochromic display device according to claim 1, wherein the organic electrochromic compound is a viologen compound.

7. The electrochromic display device according to claim 1, which is used for one of reflective displays and electronic paper.

8. A display apparatus comprising an electrochromic display device,
    wherein the electrochromic display device comprises:
    a display electrode formed of a substrate having a transparent conductive film;
    a counter electrode formed of a substrate having a transparent conductive film; and
    a metal oxide layer which contains a metal oxide and is disposed on the display electrode, the metal oxide layer having an organic electrochromic compound attached,
    wherein the metal oxide is a long fibrous metal oxide of a nanowire structure or a nanotube structure, and
    wherein the device has a reflectivity during colored state of not more than 7%.

9. The display apparatus according to claim 8, wherein the long fibrous metal oxide is long fibrous titanium oxide.

10. The display apparatus according to claim 8, wherein the long fibrous metal oxide has a BET specific surface area of 100 $m^2/g$ or more.

11. The display apparatus according to claim 8, wherein the organic electrochromic compound has an adsorption site that allows the organic electrochromic compound to be attached to the surface of the long fibrous metal oxide.

12. The display apparatus according to claim 11, wherein the adsorption site has the structure of phosphonic acid.

13. The display apparatus according to claim 8, wherein the organic electrochromic compound is a viologen compound.

* * * * *